United States Patent
Ikeda

(10) Patent No.: US 12,399,950 B2
(45) Date of Patent: Aug. 26, 2025

(54) WEB BROWSING SYSTEM, SERVER, AND CONTROL METHOD WITH CLOUD-OFFLOADED BROWSER ENGINE AND IDENTIFICATION-BASED USER DATA MANAGEMENT

(71) Applicant: CANON KABUSHIKI KAISHA, Tokyo (JP)

(72) Inventor: Atsushi Ikeda, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/346,025

(22) Filed: Jun. 30, 2023

(65) Prior Publication Data

US 2024/0012867 A1 Jan. 11, 2024

(30) Foreign Application Priority Data

Jul. 7, 2022 (JP) ................................ 2022-109641

(51) Int. Cl.
*H04L 9/40* (2022.01)
*G06F 16/958* (2019.01)

(52) U.S. Cl.
CPC ........ *G06F 16/958* (2019.01); *H04L 63/0876* (2013.01)

(58) Field of Classification Search
None
See application file for complete search history.

(56) References Cited

U.S. PATENT DOCUMENTS

| 8,255,812 B1* | 8/2012 | Parparita ............. G06F 16/9535 715/826 |
| 10,511,592 B1* | 12/2019 | Phruksawan ......... H04L 63/166 |
| 2012/0144458 A1* | 6/2012 | Mechaley, Jr. ......... G06F 21/43 726/5 |

(Continued)

FOREIGN PATENT DOCUMENTS

| JP | 2011060215 A | 3/2011 |
| JP | 2011141617 A | 7/2011 |

(Continued)

OTHER PUBLICATIONS

Hayashi et al., "Use Your Illusion: Secure Authentication Usable Anywhere" Symposium on Usable Privacy and Security (SOUPS) 2008, Jul. 23-25, 2008, Pittsburgh, PA USA, 11 pages. (Year: 2008).*

*Primary Examiner* — Haoshian Shih
(74) *Attorney, Agent, or Firm* — Canon U.S.A., Inc. IP Division

(57) ABSTRACT

A web browsing system includes a server that performs rendering of a web page, and a communication terminal that displays the web page based on a rendering result. The communication terminal transmits identification information and address information about the web page to the server, and receives a rendering image corresponding to the web page from the server. The server receives the address information and the identification information from the communication terminal, accesses the web page based on the address information, generates the rendering image by interpreting the web page, transmits the rendering image to the communication terminal, acquires user data based on the interpretation of the web page, and manages the user data based on the identification information in a distinguishable manner from other user data.

7 Claims, 13 Drawing Sheets

(56) References Cited

U.S. PATENT DOCUMENTS

| | | | |
|---|---|---|---|
| 2013/0003106 A1* | 1/2013 | Nishida | G06F 3/1222 |
| | | | 358/1.14 |
| 2013/0208893 A1* | 8/2013 | Shablygin | H04L 9/0894 |
| | | | 380/277 |
| 2016/0267094 A1* | 9/2016 | Darnell | G06F 16/958 |

FOREIGN PATENT DOCUMENTS

| | | |
|---|---|---|
| JP | 2022041717 A | 3/2022 |
| JP | 2022077175 A | 5/2022 |
| WO | 2011058635 A1 | 5/2011 |

* cited by examiner

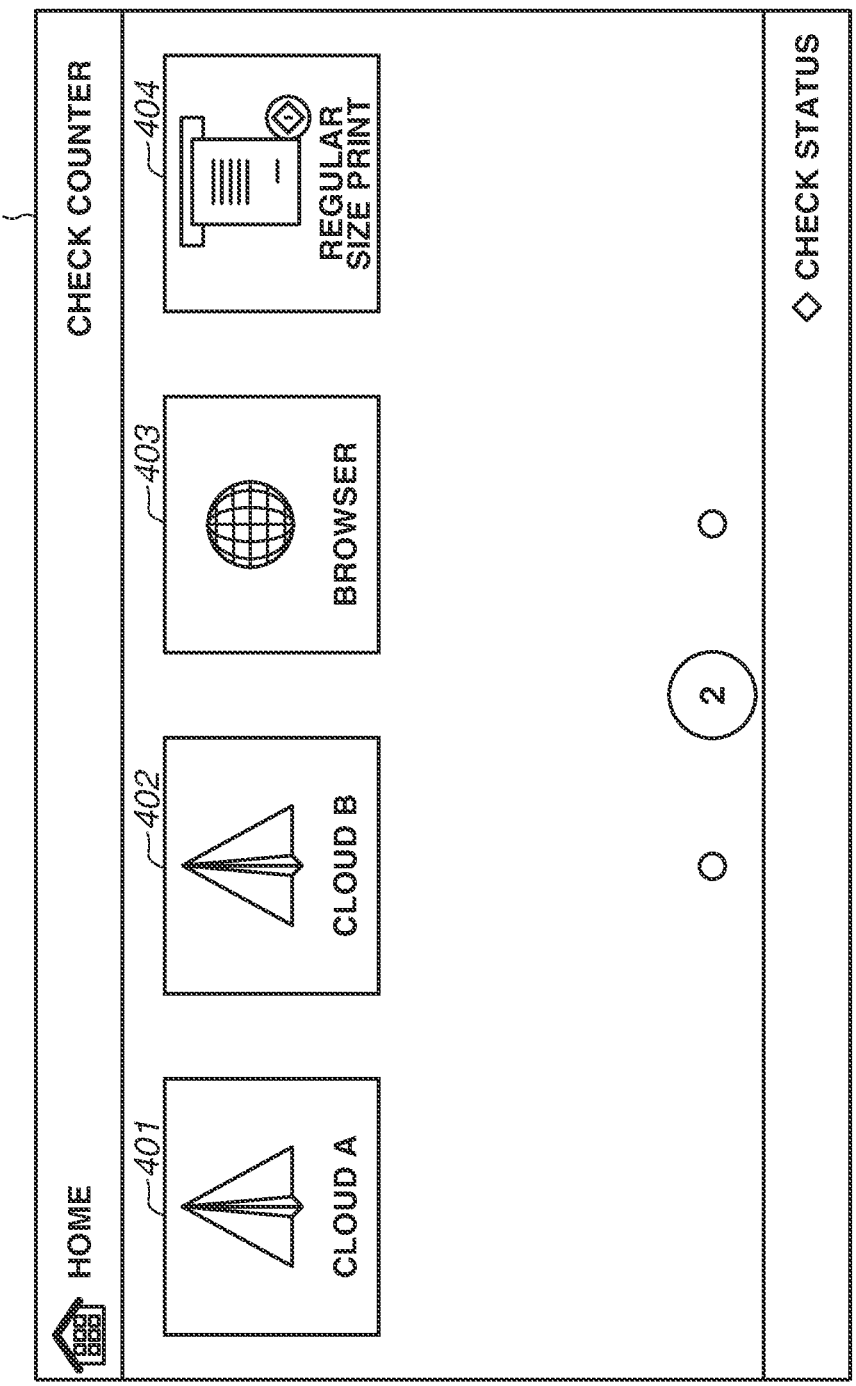

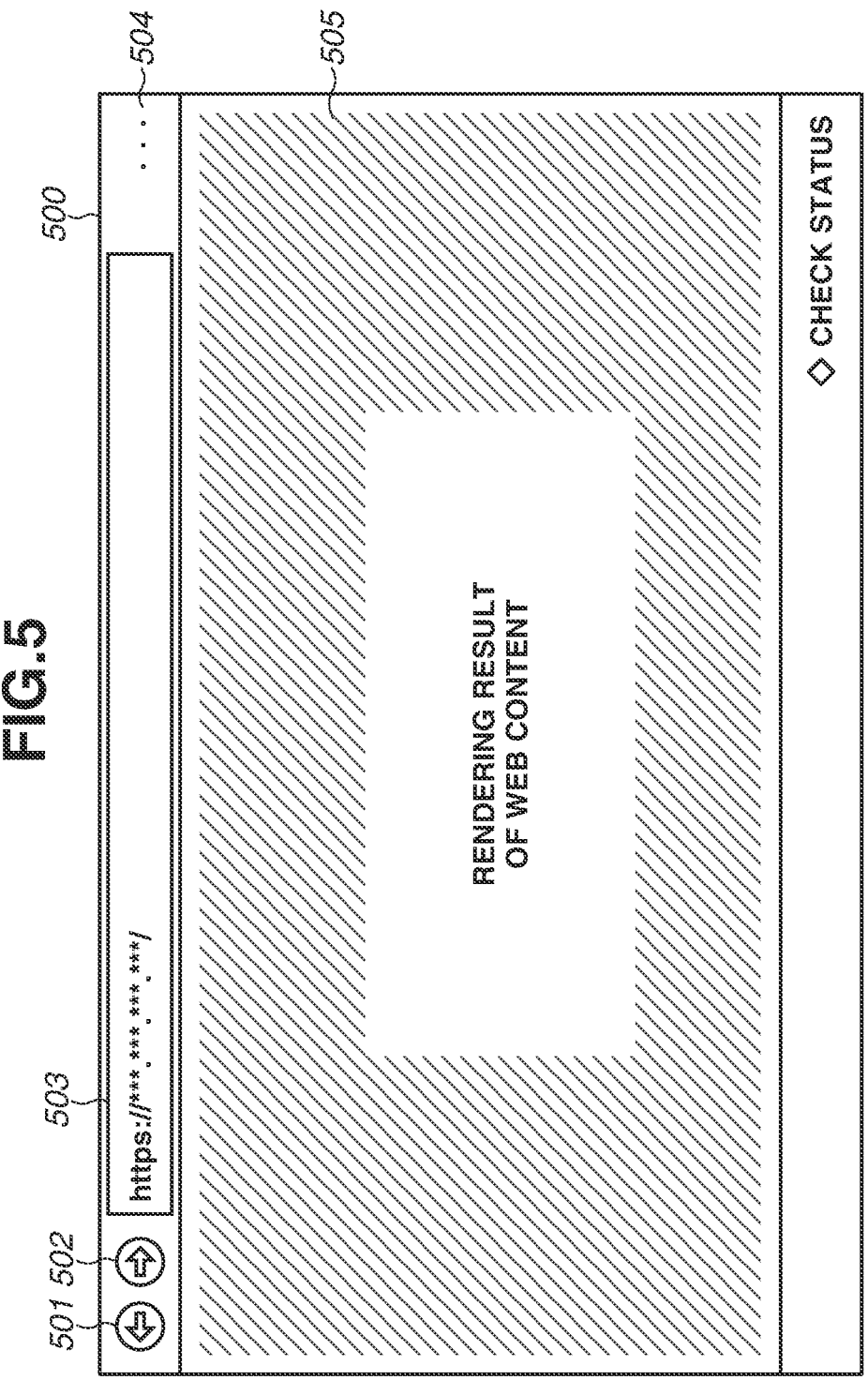

FIG.11A

```
"bToken": {
  "clientId": "11-22-33-44-55-66",   ~11-02
  "token": "9sntEhywcKDp"
}              11-03
```
11-01

FIG.11B

```
"bToken": {
  "clientId": "pooh@xxxxx.jp",   ~11-05
  "token": "jfrmssXqkV2D6VAtpeKHZpU4"
}                    11-06
```
11-04

FIG.12

```
12-01
/root/.config/              12-02
        ├── MTEtMjItMzMtNDQtNTUtNjY=   (MAC: FOLDER OF 11-22-33-44-55-66)
        │                    ┌─12-03
        ├── cG9vaEBjYW5vbi5qcA==       (FOLDER OF pooh@xxxxx.jp)
        │                    ┌─12-04
        ├── dGlnZ2VyQGNhbm9uLmpw       (FOLDER OF tigger@xxxxx.jp)
        │                    ┌─12-05
        ├── cGlnbGV0QGNhbm9uLmpw       (FOLDER OF piglet@xxxxx.jp)
        ⋮
```

WEB BROWSING SYSTEM, SERVER, AND CONTROL METHOD WITH CLOUD-OFFLOADED BROWSER ENGINE AND IDENTIFICATION-BASED USER DATA MANAGEMENT

BACKGROUND

Field of the Disclosure

The present disclosure relates to a web browsing system that a browser engine is offloaded to a cloud. Communication terminals that can use the web browsing system include image processing apparatuses such as printers, scanners, facsimiles (FAX), and multifunction peripherals having these functions and also general-purpose information processing apparatuses such as personal computers and mobile terminals.

Description of the Related Art

Conventionally, there have been known communication terminals, such as image processing apparatuses (information processing apparatuses), which are provided with web browsers (hereinbelow, referred to as browsers) and have a function of browsing web pages on the browsers. The communication terminal that accesses a web page of an external service through the web browser can extend its function by cooperating with the external service.

Recently, a mechanism called a cloud browser has been discussed that uses an image generation server to generate a drawing result of a web page on a cloud server. Japanese Patent Application Laid-Open No. 2022-41717 discusses a system that renders a web page in a virtual machine on a network different from a network where a communication terminal is and displays the rendering result on the communication terminal. Further, Japanese Patent Application Laid-Open No. 2022-41717 discusses a technique for storing a file, which is generated while a browser engine of the virtual machine interprets and processes the web page, in an arbitrary location on a cloud and shares the file with a browser engine of another virtual machine.

SUMMARY

According to an aspect of the present disclosure, a web browsing system includes a server that performs rendering of a web page, and a communication terminal that displays the web page based on a rendering result. The communication terminal transmits identification information and address information about the web page to the server, and receives a rendering image corresponding to the web page from the server. The server receives the address information and the identification information from the communication terminal, accesses the web page based on the address information, generates the rendering image by interpreting the web page, transmits the rendering image to the communication terminal, acquires user data based on the interpretation of the web page, and manages the user data based on the identification information in a distinguishable manner from other user data.

Further features of the present disclosure will become apparent from the following description of exemplary embodiments with reference to the attached drawings.

BRIEF DESCRIPTION OF THE DRAWINGS

FIG. 4 is a diagram illustrating an example of a home screen displayed on an operation unit of the image forming apparatus.

FIG. 5 is a diagram illustrating an example of a browser screen.

FIGS. 11A and 11B are diagrams illustrating examples of bTokens issued by the browser processing unit.

FIG. 12 is a diagram illustrating an example of a folder structure in which user data is stored.

DESCRIPTION OF THE EMBODIMENTS

Exemplary embodiments of the present disclosure will be specifically described below with reference to the attached drawings. The scope of the present disclosure is not limited to configurations described in the exemplary embodiments. A part of the configuration or a part of processing may be modified by replacing it with an equivalent or omitting it within a range where a similar effect can be acquired.

Cloud Browser System

Figure 1:
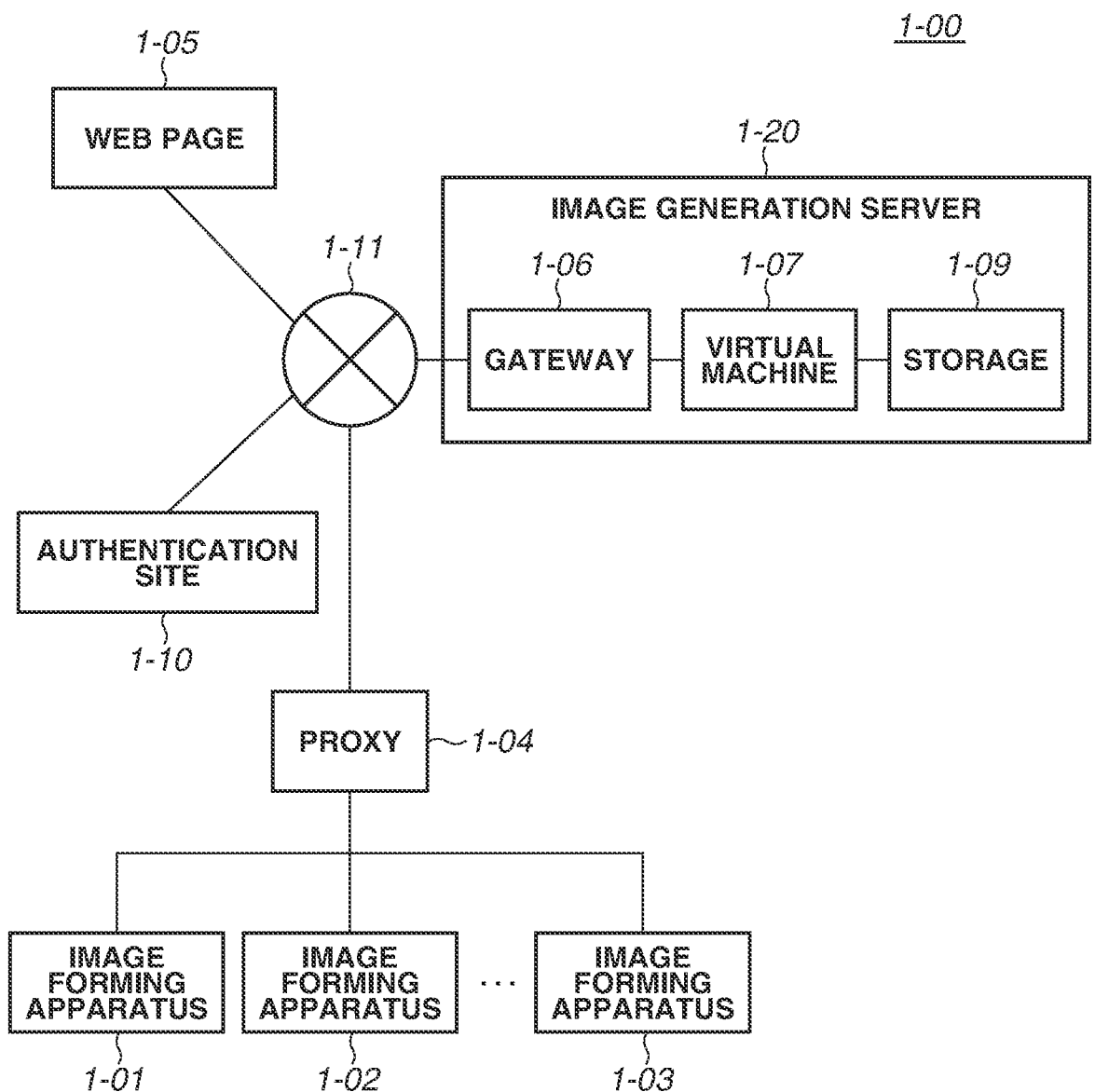
FIG. 1 is a diagram illustrating an overall configuration of a cloud browser system.

FIG. 1 is a diagram illustrating an overall configuration of a cloud browser system. A cloud browser system 1-00 is a web browsing system that renders a web content on the cloud. The cloud browser system 1-00 includes a plurality of image forming apparatuses 1-01 to 1-03 and an image generation server 1-20 to which these image forming apparatuses are connected.

The cloud browser system 1-00 also includes a web page 1-05 (a web content providing server) that provides a web page, a proxy 1-04, and an authentication site 1-10, or cooperates with an external service. FIG. 1 illustrates the example in which three image forming apparatuses 1-01 to 1-03 are connected to one image generation server 1-20. However, any number of the image forming apparatuses can be connected to the image generation server 1-20. The image generation server 1-20 is configured to provide services to the plurality of image forming apparatuses in parallel or in a time division manner. Thus, the number of the image generation servers 1-20 is relatively smaller than the number of the image forming apparatuses in the cloud browser system 1-00. A plurality of image generation servers may be provided within the cloud browser system 1-00 for a purpose of distributing a load or the like. A relationship between each image forming apparatus and the image generation server 1-20 is described below taking the image forming apparatus 1-01 as an example that represents the plurality of image forming apparatuses.

The image generation server 1-20 is a system on the cloud and provides a service to substitute rendering of a web content. The image generation server 1-20 includes a gateway 1-06, a virtual machine 1-07, and a storage 1-09. Although details are described below, a browser engine, which is a software module, operates on the virtual machine 1-07 in the image generation server 1-20. The browser engine receives a Uniform Resource Locator (URL) of the web page 1-05 transmitted from the image forming apparatus 1-01 via the gateway 1-06. The browser engine accesses the web page 1-05 corresponding to the received URL via the gateway 1-06 and receives a web content, such as a HyperText Markup Language (HTML), from the web page 1-05.

Then, a software module that is separately prepared to perform rendering generates a rendering result of the received web content. The rendering result is transmitted to the image forming apparatus 1-01 via the gateway 1-06.

To simplify the description, according to a first exemplary embodiment, the image generation server 1-20 is configured to include only one virtual machine 1-07. However, for example, a plurality of virtual machines may be provided to improve availability and durability. In this case, a load balancer is arranged between the gateway 1-06 and the virtual machines. Then, one virtual machine is selected from the plurality of virtual machines according to a load status, and the storage 1-09 is shared by the plurality of virtual machines while a browser engine operates on the selected virtual machine.

The storage 1-09 provided in the image generation server 1-20 stores user data such as cookie obtained by interpreting the web content received by the above-described browser engine from the web page 1-05. In addition, the cloud browser system 1-00 according to the first exemplary embodiment is configured to communicate with the authentication site 1-10 in order to identify a user who uses the image forming apparatus 1-01. The image generation server 1-20 communicates with the authentication site 1-10 to authenticate the user based on user information transmitted from the image forming apparatus 1-01. Then, the image generation server 1-20 manages the user data stored in the storage 1-09 for each authenticated user. Details are described below.

The image forming apparatus 1-01 is an image processing apparatus (an information processing apparatus, or a communication terminal) that has a function of forming (printing) an image on a sheet (paper), a function of transmitting image data generated by scanning to a desired destination, or the like. The image forming apparatus 1-01 may be either a multi-function peripheral (MFP) or single-function peripheral (SFP) type printer. Further, a printing method of the image forming apparatus 1-01 may be either an electrophotographic method or an inkjet method. The image forming apparatus 1-01 according to the present exemplary embodiment is characterized by browsing and displaying the web content on the Internet 1-11 using the image generation server 1-20. Details are described below.

The proxy 1-04 is a server that monitors and restricts communication between a network to which the image forming apparatus 1-01 belongs and the Internet 1-11. The proxy 1-04 performs URL filtering (web filtering) to restrict access to a website.

Virtual Machine

Figure 2A:
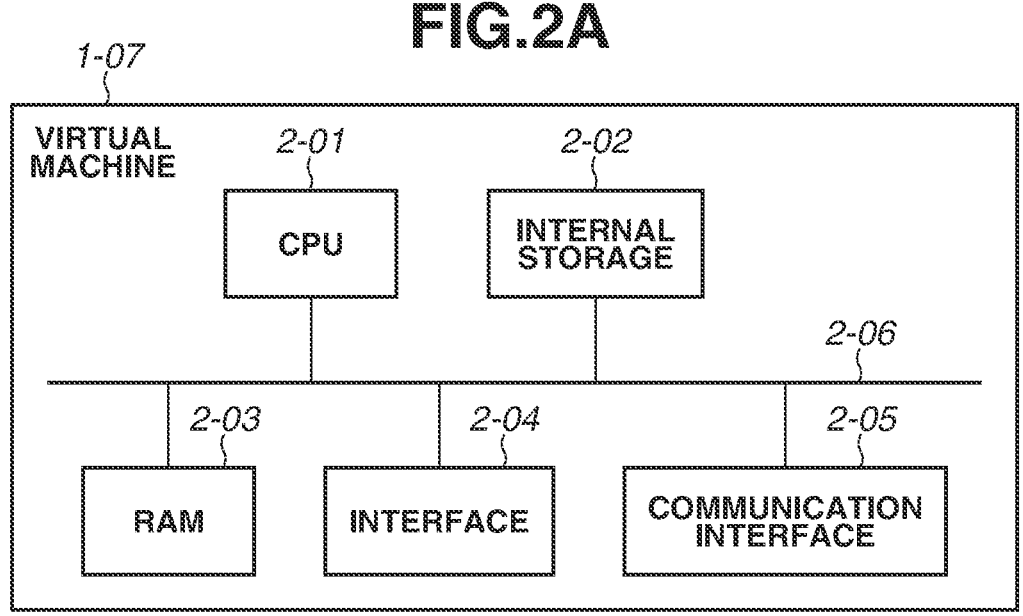
FIG. 2A is a block diagram illustrating an example of a hardware configuration of a virtual machine that operates in the cloud browser system.

FIG. 2A is a block diagram illustrating an example of a hardware configuration of the virtual machine 1-07 that operates in the cloud browser system 1-00.

The virtual machine 1-07 includes a central processing unit (CPU) 2-01, an internal storage 2-02, a random access memory (RAM) 2-03, an interface 2-04, and a communication interface 2-05. These components are communicably connected to each other via a bus 2-06.

The CPU 2-01 is a control unit that performs various types of control on the virtual machine 1-07. The CPU 2-01 executes various types of processing using a computer program and data stored in the internal storage 2-02. Accordingly, the CPU 2-01 controls operations in the virtual machine 1-07 as a whole, and executes or controls each processing described below that is operated on the virtual machine 1-07.

The internal storage 2-02 stores setting data of the virtual machine 1-07, a computer program and data related to the activation of the virtual machine 1-07, a computer program and data related to a basic operation of the virtual machine 1-07, and the like.

The RAM 2-03 includes an area for storing a computer program and data loaded from the internal storage 2-02 and data received from an external apparatus via the communication interface 2-05. The RAM 2-03 also includes a work area used by the CPU 2-01 to execute various types of processing. In this way, the RAM 2-03 can provide various areas (storage areas) as appropriate.

The interface 2-04 includes a display unit for displaying a result of processing performed by the CPU 2-01 as an image and a character and an operation unit for a user to perform various operation inputs. The display unit includes a liquid crystal display screen or a touch panel screen. The operation unit includes user interfaces such as a keyboard, a mouse, and a touch panel screen.

The communication interface 2-05 is an interface for performing data communication with an external apparatus. As the communication interface 2-05, for example, a network interface conforming to the Ethernet is used.

The configuration illustrated in FIG. 2A is merely an example of a configuration applicable to the virtual machine 1-07, and is not intended to limit the configuration of the virtual machine 1-0 to the one illustrated in FIG. 2A. For example, a memory device may be further connected to the bus 2-06 in the configuration illustrated in FIG. 2A. Examples of the memory device includes a hard disk drive, a Universal Serial Bus (USB) memory, a magnetic card, an optical card, an integrated circuit (IC) card, a memory card, and a drive device.

The virtual machine 1-07 can be configured by virtualization technology, and makes it possible to organize various resources that configure a computer system into a logical unit independent of a physical configuration. In other words, the virtual machine 1-07 can be configured by integrating a plurality of resources, or one resource is divided, and one of them can be configured as the virtual machine 1-07. The virtual machine 1-07 can also be configured by using at least a part of a plurality of resources (which can be configured by a plurality of devices) in the information processing system that configure the cloud.

Figure 2B:
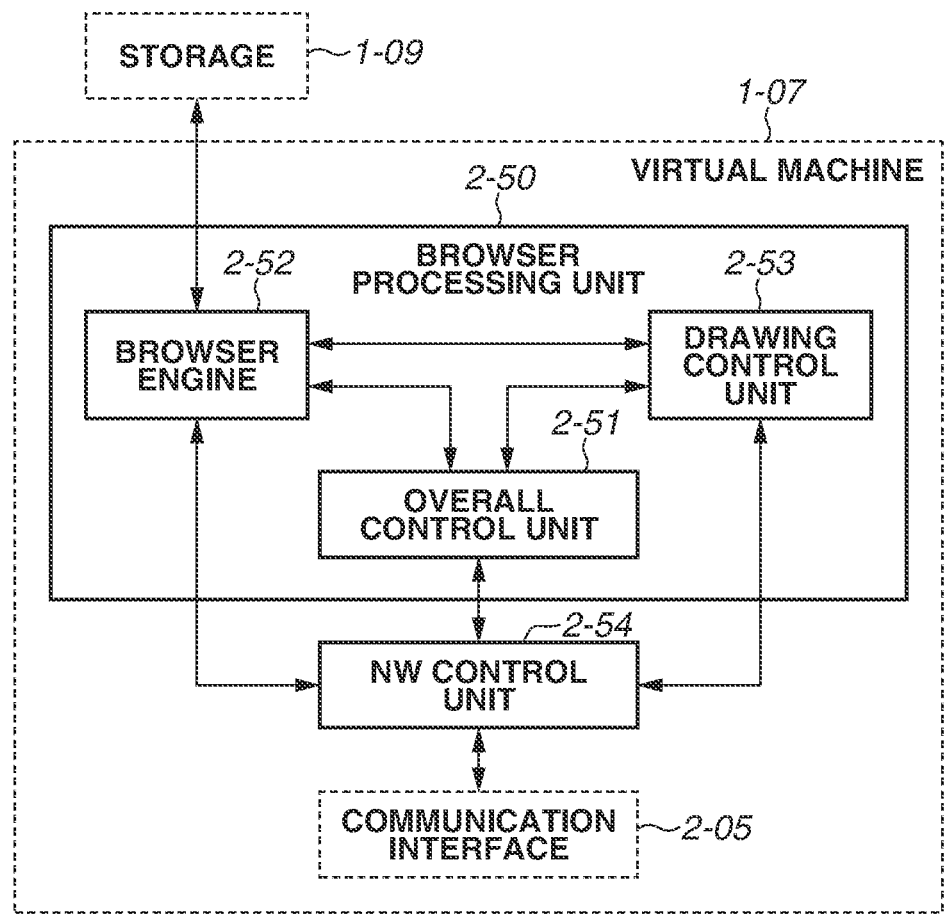
FIG. 2B is a diagram illustrating a software configuration of the virtual machine that operates in the cloud browser system.

FIG. 2B is a diagram illustrating a software configuration of the virtual machine 1-07 that operates in the cloud browser system 1-00. As illustrated in FIG. 2B, the virtual machine 1-07 includes a browser processing unit 2-50 and a network (NW) control unit 2-54 as software modules.

The browser processing unit 2-50 is a module that handles entire processing related to the browser executed on the cloud and is a main part of the cloud browser system 1-00. The browser processing unit 2-50 includes an overall control unit 2-51, a browser engine 2-52, and a drawing control unit 2-53.

The overall control unit 2-51 is a module that controls the entire browser processing unit 2-50 operating on the virtual machine 1-07. If a user operates the image forming apparatus 1-01 and inputs a request to browse the web page 1-05, the URL of the web page 1-05 is transmitted from the image forming apparatus 1-01 to the image generation server 1-20 via the proxy 1-04. The overall control unit 2-51 has a role in collectively receiving various requests transmitted from the image forming apparatus 1-01. The overall control unit 2-51 also has a role in appropriately distributing the received requests to the browser engine 2-52 and the drawing control unit 2-53, which are described below.

The browser engine 2-52 accesses the web page 1-05 illustrated in FIG. 1 via the NW control unit 2-54 described below based on the URL transmitted from the overall control unit 2-51 and acquires the web content. The browser engine 2-52 has a function as a Hypertext Transfer Protocol (HTTP) client for acquiring the web content. Then, the browser engine 2-52 analyzes the acquired web content and stores information, such as cookies, in the storage 1-09 illustrated in FIG. 1 as appropriate. The browser engine 2-52 also has a role in referring to the information, such as cookies, stored in advance in the storage 1-09. In addition, upon completing the analysis of the web content, the browser engine 2-52 requests the drawing control unit 2-53 described below to perform rendering processing.

The drawing control unit 2-53 has a role in rendering the web content in response to the rendering request from the browser engine 2-52. The drawing control unit 2-53 also has a role in returning the rendering result to the image forming apparatus 1-01, which is a URL request source, via the NW control unit 2-54 described below.

The NW control unit 2-54 is a module that receives access requests from the overall control unit 2-51, the browser engine 2-52, and the drawing control unit 2-53 and mediates communication between the requesting unit and the outside. The outside to which the access request is made includes the image forming apparatus 1-01, the web page 1-05, and the authentication site 1-10. The NW control unit 2-54 also includes a protocol stack for HTTP communication required to access the web page 1-05. When the NW control unit 2-54 actually performs communication, the NW control unit 2-54 controls the communication interface 2-05 illustrated in FIG. 2A and implements communication with the image forming apparatus 1-01, the web page 1-05, and the authentication site 1-10.

Image Forming Apparatus

Figure 3A:
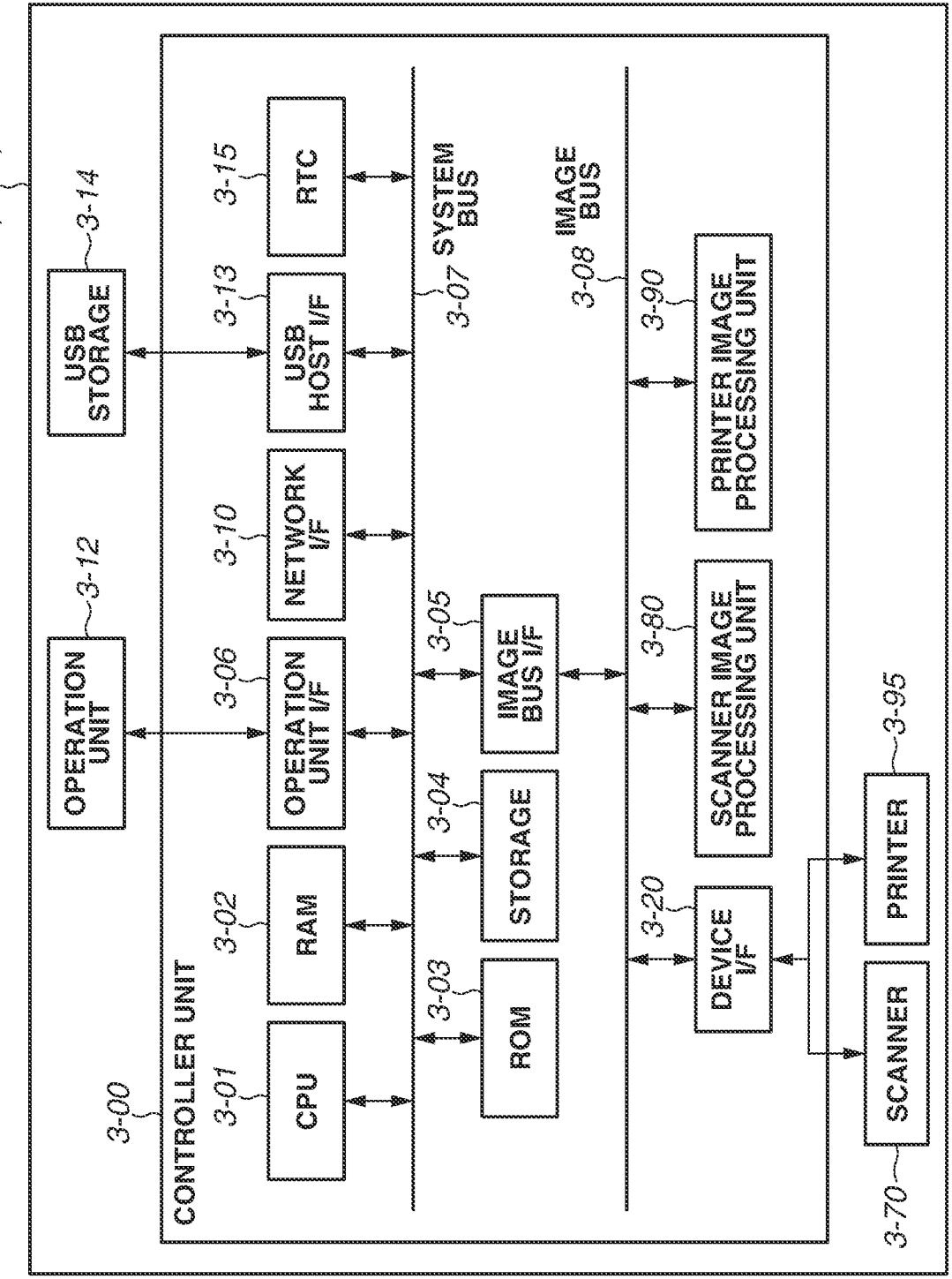
FIG. 3A is a diagram illustrating a hardware configuration of an image forming apparatus that operates in the cloud browser system.

FIG. 3A is a diagram illustrating a hardware configuration of the image forming apparatus that operates in the cloud browser system 1-00. The image forming apparatus 1-01 includes a controller unit 3-00, an operation unit 3-12, a USB storage 3-14, a scanner 3-70, and a printer 3-95.

The controller unit 3-00 is connected to the scanner 3-70 as an image input device, the printer 3-95 as an image output device, and the operation unit 3-12.

The operation unit 3-12 displays information to a user and receives an input from the user.

The operation unit 3-12 includes, for example, a display, a touch panel sensor, and hard keys.

The USB storage 3-14 is an external storage device that stores data. The USB storage 3-14 is attachable to and detachable from a USB host interface (I/F) 3-13.

The scanner 3-70 is an image reading unit (an image reading device or an image input device) that reads an image from a document.

The printer 3-95 is an image forming unit (an image forming device or an image output device) that forms an image on a sheet (paper).

The controller unit 3-00 is a control unit including a configuration for performing various controls in the image forming apparatus 1-01. For example, the controller unit 3-00 performs control to implement a copy function of printing image data read by the scanner 3-70 and outputting the printed image data from the printer 3-95.

The controller unit 3-00 includes a CPU 3-01, a RAM 3-02, a read-only memory (ROM) 3-03, a storage 3-04, and an image bus OF 3-05. These components are communicably connected to each other via a system bus 3-07.

The controller unit 3-00 also includes an operation unit OF 3-06, a network OF 3-10, the USB host OF 3-13, a real-time clock (RTC) 3-15, a device OF 3-20, a scanner image processing unit 3-80, and a printer image processing unit 3-90. These components and the image bus OF 3-05 are communicably connected to each other via an image bus 3-08.

The CPU 3-01 activates an operation system (OS) by executing a boot program stored in the ROM 3-03. The CPU 3-01 executes a program stored in the storage 3-04 on the OS, and thus executes various types of processing.

The RAM 3-02 is used as a work area for the CPU 3-01. The RAM 3-02 provides the work area as well as an image memory area for temporarily storing image data.

The storage 3-04 stores a program and image data. A hard disk drive (HDD), a solid state drive (SSD), and an embedded MultiMedia Card (eMMC) can be used as the storage 3-04.

The CPU 3-01 is connected to the ROM 3-03, the RAM 3-02, the operation unit OF 3-06, and the network OF 3-10 via the system bus 3-07. The CPU 3-01 is also connected to the USB host OF 3-13 and the image bus OF 3-05.

The operation unit OF 3-06 is an interface with the operation unit 3-12, and outputs image data to be displayed on the operation unit 3-12 to the operation unit 3-12. The operation unit I/F 3-06 also transmits information input by a user via the operation unit 3-12 to the CPU 3-01.

The network I/F 3-10 is an interface for connecting the image forming apparatus to a local area network (LAN).

The USB host I/F 3-13 is an interface unit that communicates with the USB storage 3-14. The USB host I/F 3-13 also functions as an output unit for causing the USB storage 3-14 to store the data stored in the storage 3-04. The USB host I/F 3-13 also inputs data stored in the USB storage 3-14 to the CPU 3-01 and notifies the CPU 3-0 of the data input.

The USB storage 3-14 is an external storage device that stores data and is removable from the USB host I/F 3-13. A plurality of USB devices including the USB storage 3-14 can be connected to the USB host I/F 3-13.

The RTC 3-15 controls a current time. Time information controlled by the RTC 3-15 is used to record a job input time and the like.

The image bus I/F 3-05 is a bus bridge that connects the system bus 3-07 and the image bus 3-08 that transfers image data at high speed, and converts a data format.

The image bus 3-08 includes a peripheral component interconnect (PCI) bus and the like. The device I/F 3-20, the scanner image processing unit 3-80, and the printer image processing unit 3-90 are provided on the image bus 3-08.

The device I/F 3-20 is connected to the scanner 3-70 and the printer 3-95, and performs synchronous and asynchronous conversion of image data.

The scanner image processing unit 3-80 corrects, processes, and edits input image data.

The printer image processing unit 3-90 performs correction and resolution conversion suitable for the printer 3-95 on print output image data.

Figure 3B:
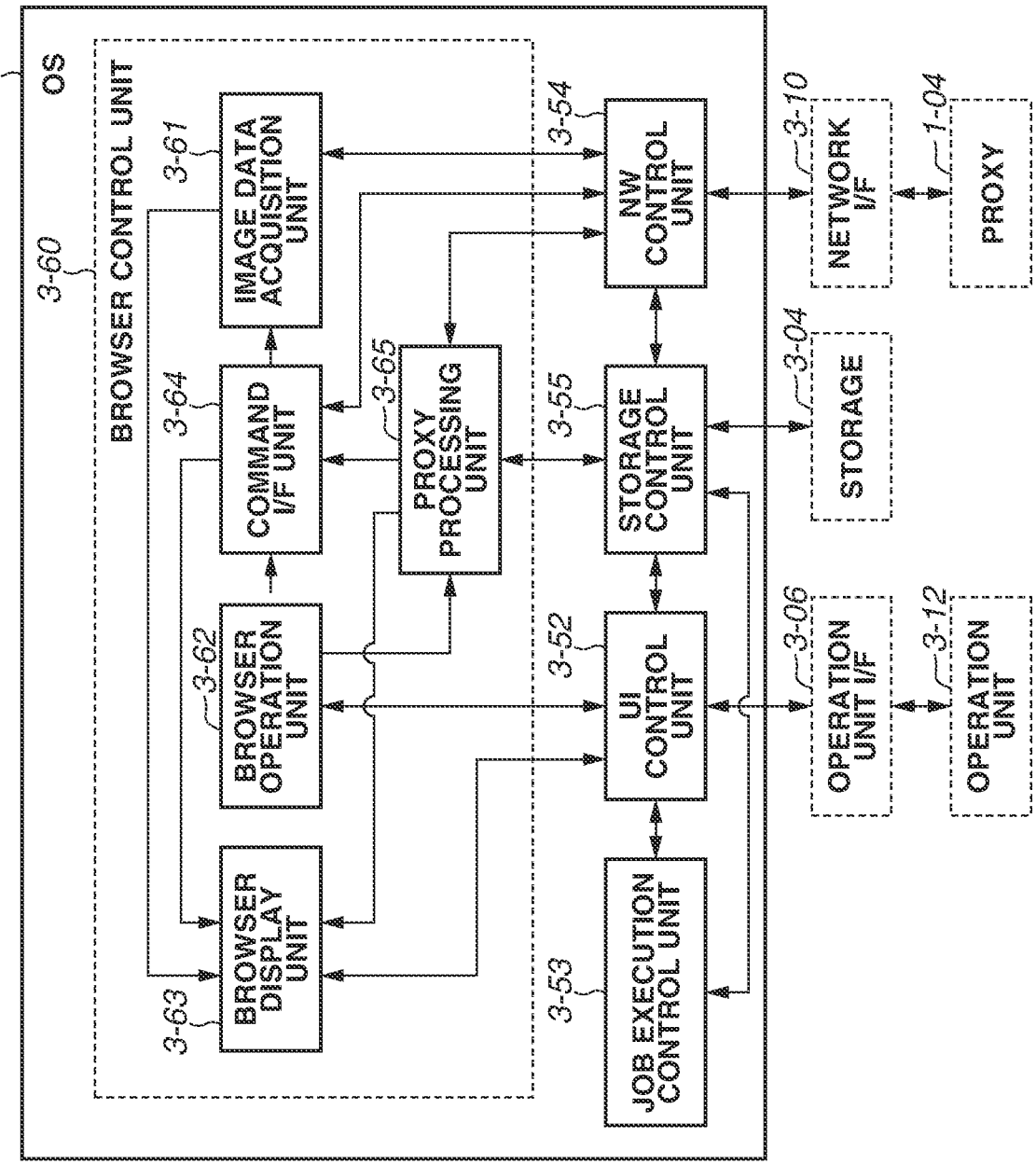
FIG. 3B is a diagram illustrating a software configuration of the image forming apparatus that operates in the cloud browser system.

FIG. 3B is a diagram illustrating a software configuration of the image forming apparatus that operates in the cloud browser system 1-00.

Each unit indicated by a solid line in FIG. 3B is a software module realized by the CPU 3-01 executing a main program loaded into the RAM 3-02.

In the main program, an operating system (OS) 3-51 manages and controls execution of each module described below.

A user interface (UI) control unit 3-52 displays a screen on the operation unit 3-12 and receives an operation from a user via the operation unit OF 3-06. The UI control unit 3-52 also has a function of transmitting a notification to another module and receiving a drawing instruction from the other module to control screen update.

A job execution control unit 3-53 is a module that receives a job execution instruction from the UI control unit 3-52 and controls job processing such as copying, scanning, and printing.

A NW control unit 3-54 receives a communication request from another module, and controls the network I/F 3-10 to control communication with an external apparatus. The NW control unit 3-54 also receives a notification form the external apparatus and notifies the other module of the content of the notification.

A storage control unit 3-55 records and manages setting information and job information recorded in the storage 3-04. Each module located in an OS hierarchy accesses the storage control unit 3-55 to refer to and set a setting value.

A browser control unit 3-60 is a sub-module included in the OS 3-51 and performs control specific to the cloud browser, which is described below. The OS 3-51 includes any number of sub-modules.

A browser operation unit 3-62 has a function of notifying a command I/F unit 3-64 or a proxy processing unit 3-65 of the content of a user operation upon receiving a notification of the user operation from the UI control unit 3-52.

The proxy processing unit 3-65 receives the notification from the browser operation unit 3-62 and requests the storage control unit 3-55 to acquire proxy setting information. In a case where a proxy setting is valid based on the acquired proxy setting information, the proxy processing unit 3-65 transmits a communication request to the proxy 1-04 via the NW control unit 3-54. Further, the proxy processing unit 3-65 has a function of receiving a response to the communication request from the NW control unit 3-54 and notifying a browser display unit 3-63 or the command I/F unit 3-64 of a result of processing the content of the response.

The command I/F unit 3-64 receives notifications from the browser operation unit 3-62 and the proxy processing unit 3-65 and requests communication with the image generation server 1-20 via the NW control unit 3-54. The communication request at this time may include notified information. The notified information includes a user operation such as text input, pressing of a link, scrolling, and zooming. For example, the text input includes the URL. The pressing of a link includes the coordinates where the pressing is performed on the operation unit 3-12, and the scrolling and zooming include a character string associated with each operation. The command I/F unit 3-64 also receives communication from the image generation server 1-20 via the NW control unit 3-54. The command I/F unit 3-64 processes the received content and transmits a notification to an image data acquisition unit 3-61 or the browser display unit 3-63.

The image data acquisition unit 3-61 receives a completion notification of the rendering result from the command I/F unit 3-64. Upon receiving the notification, the image data acquisition unit 3-61 requests the image generation server 1-20 to acquire an image. As described in FIG. 2B, the image acquisition request is transmitted to the drawing control unit 2-53 that operates on the virtual machine 1-07 included in the image generation server 1-20, the image is transmitted from the drawing control unit 2-53, and the rendering result is returned to the image data acquisition unit 3-61. The image data acquisition unit 3-61 that receives the rendering result transfers the image, which is the rendering result, to the browser display unit 3-63.

The browser display unit 3-63 receives the image from the image data acquisition unit 3-61 and instructs the UI control unit 3-52 to draw the image. Alternatively, the browser display unit 3-63 receives the notifications from the command I/F unit 3-64 and the proxy processing unit 3-65 and instructs the UI control unit 3-52 to display a message corresponding to the notifications.

Flow of Processing to Use System

FIG. 4 illustrates an example of a home screen displayed on the operation unit 3-12 of the image forming apparatus. A home screen 400 displays a plurality of buttons that allow a user to execute functions associated with the image forming apparatus. A button 401 corresponds to a "cloud A" function. A button 402 corresponds to a "cloud B" function. A button 403 corresponds to the cloud browser system 1-00. A button 404 corresponds to a "regular size print" function.

If a user presses the button 403 of the browser, the browser control unit 3-60 illustrated in FIG. 3B is activated.

FIG. 5 is a diagram illustrating an example of a browser screen.

As described in FIG. 4, if the browser control unit 3-60 is activated by pressing the button 403 of the browser, a browser screen 500 illustrated in FIG. 5 is displayed on the operation unit 3-12 in the image forming apparatus 1-01.

The browser screen 500 includes a return button 501, an advance button 502, an address bar 503, and a setting button 504. The browser screen 500 also includes a content area 505 for displaying the rendering result of the web content below these buttons. The roles of these buttons are the same as those of buttons included an existing browser.

The content area 505 is configured not to display anything thereon from when the browser control unit 3-60 is activated until the URL is input. Like the existing browser, the browser screen 500 may be configured so that a default URL can be registered in an item in the address bar 503, and a rendering result of a web content of the default URL is displayed upon the activation. FIG. 5 illustrates an example in which a result of rendering some web content acquired from a web page indicated by the URL "https://\*\*\*.\*\*\*.\*\*\*.\*\*\*/" is displayed.

If a user operates the image forming apparatus 1-01 and inputs a browsing request for the web page 1-05 that the user wants to browse, the URL of the web page 1-05 is transmitted from the image forming apparatus 1-01 to the image generation server 1-20 via the proxy 1-04. The overall control unit 2-51 receives the URL and transfers it to the browser engine 2-52. The browser engine 2-52 that receives the URL requests the NW control unit 2-54 to access the web page 1-05 indicated by the URL in order to acquire the web content indicated by the URL. The NW control unit 2-54 that receives the access request controls the communication interface 2-05 and accesses the web page 1-05 via the gateway 1-06 and the Internet 1-11. Then, the NW control unit 2-54 acquires the web content from the web page 1-05 and transmits the web content to the browser engine 2-52. The browser engine 2-52 exchanges the user data, such as cookies, with the storage 1-09 as necessary based on the transmitted web content and analyzes the web content.

The browser engine 2-52 also requests the drawing control unit 2-53 to render the web content according to the analysis. The drawing control unit 2-53 that receives the request executes rendering of the web content and notifies the overall control unit 2-51 of completion of rendering.

The overall control unit 2-51 returns a notification of the completion of rendering via the NW control unit 2-54 to the image forming apparatus 1-01, which is the URL request source. The image forming apparatus 1-01 that receives the completion notification requests acquisition of the rendering result from the image generation server 1-20. The request is transmitted to the overall control unit 2-51 via the NW control unit 2-54, and then the overall control unit 2-51 transfers the request to the drawing control unit 2-53. Then, the drawing control unit 2-53 that receives the request of acquisition of the rendering result returns the rendering result to the image forming apparatus 1-01 as the request source via the NW control unit 2-54.

The image forming apparatus 1-01 displays the rendering result. In this way, the user can browse the content of the desired web page 1-05 using the image forming apparatus 1-01. The image forming apparatus 1-01 can print out or store an image of the browsed web page.

User Data Management

Figure 6:
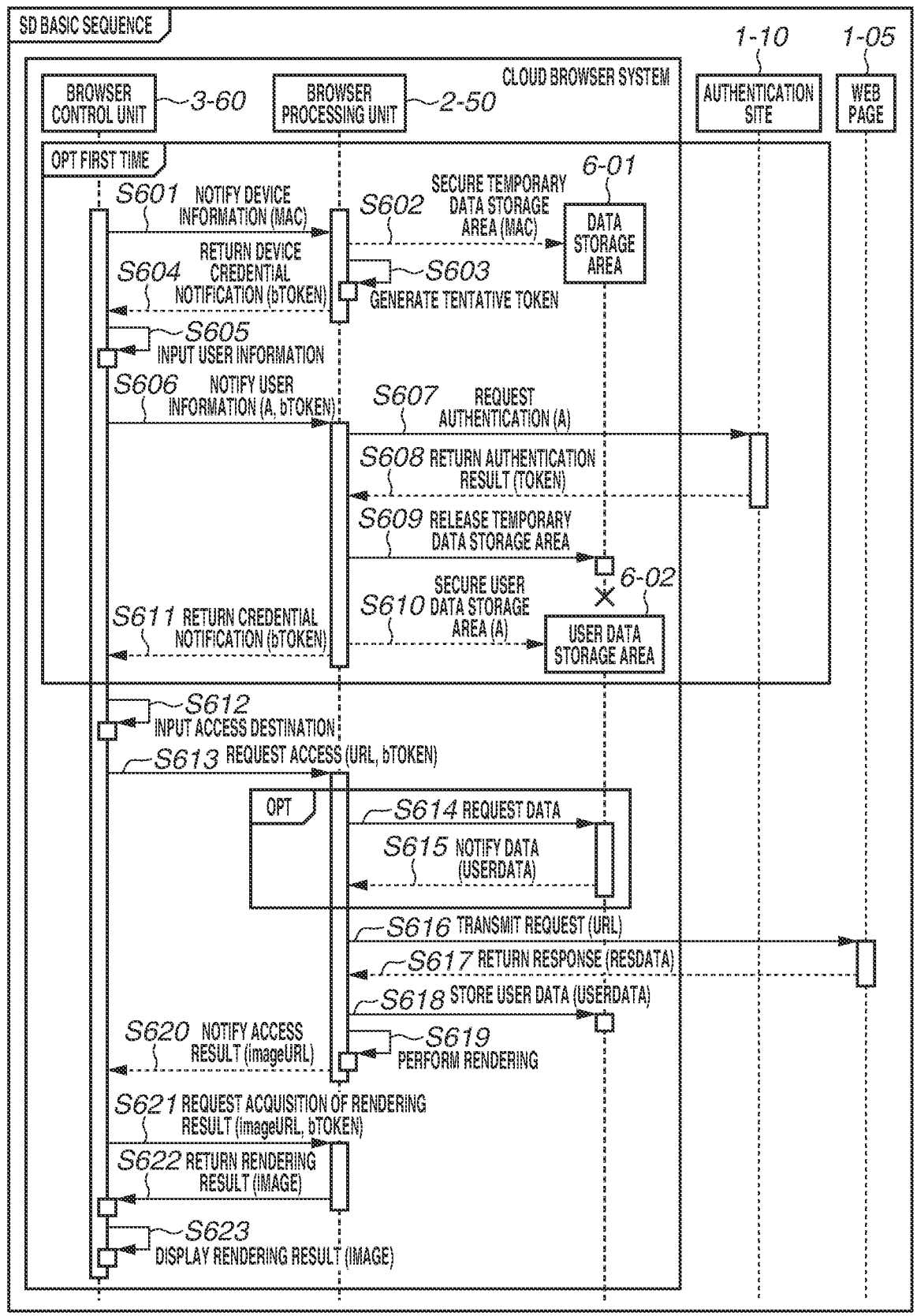
FIG. 6 is a sequence diagram illustrating standard interaction among blocks in the cloud browser system.

FIG. 6 is a sequence diagram illustrating standard interaction among blocks in the cloud browser system 1-00.

The sequence diagram illustrates the interaction among the browser control unit 3-60, which is a software module of the image forming apparatus 1-01, the browser processing unit 2-50, which is a software module of the image generation server 1-20, the authentication site 1-10, and the web page 1-05.

The interaction in steps S601 to S611 in the sequence diagram is a sequence to be executed in a case where the browser control unit 3-60 connects to the image generation server 1-20 for the first time. For the second and subsequent times, the interaction up to step S611 is skipped until a token described below expires, and the rendering result of the web content on the web page can be displayed on the operation unit 3-12 only by the interaction after step S612.

In step S601, first, the browser control unit 3-60 notifies the browser processing unit 2-50 of a unique identifier assigned to the image forming apparatus 1-01 as device information. According to the present exemplary embodiment, the browser control unit 3-60 uses a media access control (MAC) address assigned to the image forming apparatus 1-01 as the identifier (identification information). However, the identifier needs not necessarily be a MAC address as long as it is unique to the image forming apparatus 1-01. The identifier can be, for example, an apparatus serial number assigned to the image forming apparatus 1-01. Alternatively, it is more desirable to combine the serial number and the MAC address to ensure that the identifier is unique.

The notified device information is transferred to the overall control unit 2-51, which is the sub-module of the browser processing unit 2-50, as described in FIG. 2B. In step S602, the overall control unit 2-51 secures a temporary data storage area 6-01 in the storage 1-09 illustrated in FIG. 1 using the identifier (identification information) as a key. Details are described below. Then, the overall control unit 2-51 registers information about the secured area with the browser engine 2-52, which is the submodule of the browser processing unit 2-50. FIG. 12 illustrates a structure of the secured area. Details are described below.

Next, in step S603, the overall control unit 2-51 generates a tentative token.

Then, in step S604, the overall control unit 2-51 generates a token (hereinbelow, referred to as a bToken) that is unique to the cloud browser system 1-00 and includes the generated tentative token and the MAC address notified in step S601 as client information. FIG. 11A illustrates an example of the bToken. The generated bToken is returned to the browser control unit 3-60 in a form of a device credential notification. FIG. 11A illustrates an example of the bToken notified from the browser processing unit 2-50 to the browser control unit 3-60 in step S604. A bToken 11-01 includes clientId 11-02 and a token 11-03. The MAC address notified in step S601 is set as the clientId 11-02. Further, the token generated in step S603 is set as the token 11-03.

In step S605, the browser control unit 3-60 that receives the device credential notification prompts the user to input the user information, using the browser operation unit 3-62 and the browser display unit 3-63. The user information is generally a user name (user identification (ID)) and password information as identification information for identifying an individual at the authentication site 1-10.

In step S606, the browser control unit 3-60 notifies the browser processing unit 2-50 of the input user information as the user information.

The notified user information is transferred to the overall control unit 2-51, which is the sub-module of the browser processing unit 2-50. Then, the overall control unit 2-51 instructs the browser engine 2-52 to perform user authentication based on the user information notified by the authentication site 1-10. In step S607, the browser engine 2-52 requests the authentication site 1-10 to perform authentication.

According to the first exemplary embodiment, the authentication site 1-10 is configured to perform user authentication according to the Open Authorization (OAuth) 2.0 authentication framework defined in Request For Comments (RFC) 6749. However, the authentication method is not limited to this. For example, the image generation server 1-20 can be configured to perform simple user management.

The authentication site 1-10 executes user authentication based on the transferred user information and, in step S608, returns a token as an authentication result.

The browser engine 2-52 in the browser processing unit 2-50 that receives the token as the authentication result transfers the token to the overall control unit 2-51. In step S609, the overall control unit 2-51 releases the tentatively secured temporary data storage area 6-01. Then, in step S610, the browser processing unit 2-50 secures a user data storage area 6-02 for the user identified by the user information notified in step S606. Details are described below. Further, the browser processing unit 2-50 registers the information about the secured area with the browser engine 2-52.

In step S611, the browser processing unit 2-50 generates the bToken including the received token and the user information received in step S606 as the client information. Then, the overall control unit 2-51 in the browser processing unit 2-50 notifies the browser control unit 3-60 of the bToken as a user credential. The browser control unit 3-60 that receives the credential notification requests the storage control unit 3-55 to perform control to store the received bToken in the storage 3-04 in the image forming apparatus 1-01. FIG. 11B illustrates an example of the bToken. FIG. 11B illustrates an example of the bToken notified from the browser processing unit 2-50 to the browser control unit 3-60 in step S611. A bToken 11-04 includes clientId 11-05 and a token 11-06 as with the bToken 11-01. The user name in the user information notified in step S606 is set as the clientId 11-05. Further, the token received in step S608 is set as the token 11-06.

The interaction in step S612 and subsequent steps in the sequence diagram is typical interaction that is executed in a period from when the user inputs the URL of the web page 1-05 as an access destination until the rendering result (a rendering image) is displayed on the operation unit 3-12 in the image forming apparatus 1-01.

In step S612, the browser control unit 3-60 prompts the user to input the URL of the web page 1-05 as the access destination. Specifically, the user inputs the URL in the address bar 503 illustrated in FIG. 5. The processing described above is implemented by the browser operation unit 3-62 and the browser display unit 3-63. According to the present exemplary embodiment, only an example in which a URL is directly input is described. However, like the existing browser, a bookmark list for managing a list of access destinations can be stored, and an access destination can be selected from the list. Alternatively, apart from the button 403 for the browser illustrated in FIG. 4, a button can be displayed in such a manner that the button includes the access destination, and the access destination can be automatically designated by pressing the button.

In step S613, the browser control unit 3-60 requests the browser processing unit 2-50 to access the input URL. At this time, according to the present exemplary embodiment, the bToken notified in step S611 is included in the request in order to authorize a user data storage area in the subsequent processing. It does not need to be the bToken as long as the subsequent authorization processing can be implemented. For example, a tunnel can be constructed that enables point-to-point communication between the browser control unit 3-60 and the browser processing unit 2-50 before the processing in step S601, and all communication within this tunnel can be determined as authorized communication.

The access request in step S613 is distributed from the overall control unit 2-51, which is the sub-module of the browser processing unit 2-50, to the browser engine 2-52. Then, in steps S614 and S615, the browser engine 2-52 acquires the user data, such as cookies, from the user data storage area 6-02 registered in step S610, as necessary.

In step S616, the browser engine 2-52 transmits an http request to the web page 1-05 designated by the URL. At this time, the user data, such as cookies, acquired in step S615 is used as necessary.

In step S617, the web page 1-05 that receives the request returns the web content to the browser engine 2-52 in a form of an http response.

At this time, in step S618, the user data, such as cookies, is overwritten and stored in the user data storage area 6-02, as necessary.

In step S619, the browser engine 2-52 that receives the web content requests the drawing control unit 2-53 to render the received web content, and the drawing control unit 2-53 performs rendering processing.

In step S620, upon completion of the rendering processing, the drawing control unit 2-53 notifies the browser control unit 3-60 of an access result via the overall control unit 2-51.

In step S621, the browser control unit 3-60 that receives the access result notification requests acquisition of the rendering result from the browser processing unit 2-50. In step S622, the transmitted request is distributed from the overall control unit 2-51 in the browser processing unit 2-50 to the drawing control unit 2-53, and the rendering result is returned to the browser control unit 3-60.

Then, in step S623, in the browser control unit 3-60, the image data acquisition unit 3-61 and the browser display unit 3-63 receive the returned rendering result, and the rendering result is displayed on the operation unit 3-12.

In this way, the web content on the requested web page of the access destination is displayed on the operation unit 3-12 in the image forming apparatus 1-01.

Figure 7:
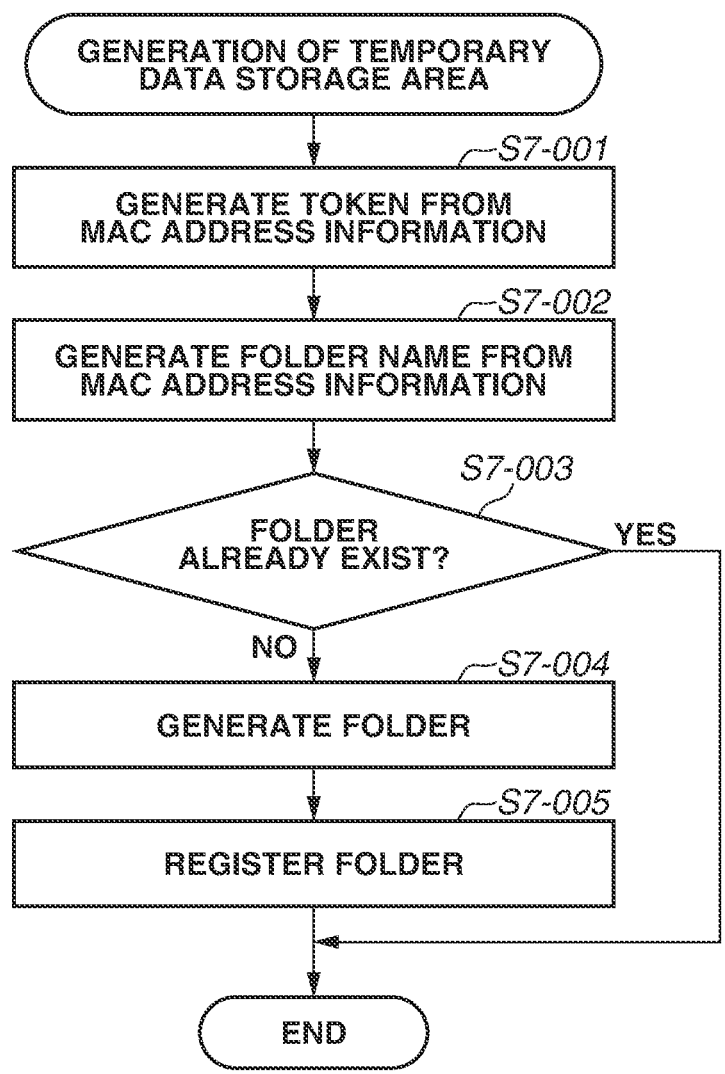
FIG. 7 is a flowchart illustrating a flow of processing for generating a temporary data storage area in a browser processing unit.

The processing in steps S601 to S603 in FIG. 6 is described in detail. FIG. 7 is a flowchart illustrating a flow of processing for generating a temporary data storage area in the browser processing unit 2-50.

The processing corresponding to FIG. 7 is started if the device information notification (in step S601) illustrated in FIG. 6 is transmitted to the image generation server 1-20. The processing is a part of a program configuring the overall control unit 2-51 illustrated in FIG. 2B and is executed by the CPU 2-01 in the virtual machine 1-07 illustrated in FIG. 2A.

In step S7-001, the CPU 2-01 generates a token from the MAC address information notified in step S601.

In step S7-002, the CPU 2-01 generates a unique folder name from the MAC address information.

In step S7-003, the CPU 2-01 determines whether a folder with the generated folder name already exists in the storage 1-09. If the folder exists (YES in step S7-003), the subsequent processing is skipped, and the temporary data storage area generation processing is terminated. If the folder does not exist (NO in step S7-003), the processing proceeds to step S7-004.

In step S7-004, the CPU 2-01 generates a folder with the folder name generated in step S7-002 under a predetermined parent folder in the storage 1-09.

In step S7-005, the CPU 2-01 registers a path of the generated folder with the browser engine 2-52, and the processing is terminated. When the folder is registered with the browser engine 2-52, a user data file, such as a cookie or a local storage, generated while the web content is interpreted and processed is automatically stored in the folder.

Next, the processing in steps S606 to S610 in FIG. 6 is described in detail.

Figure 8:
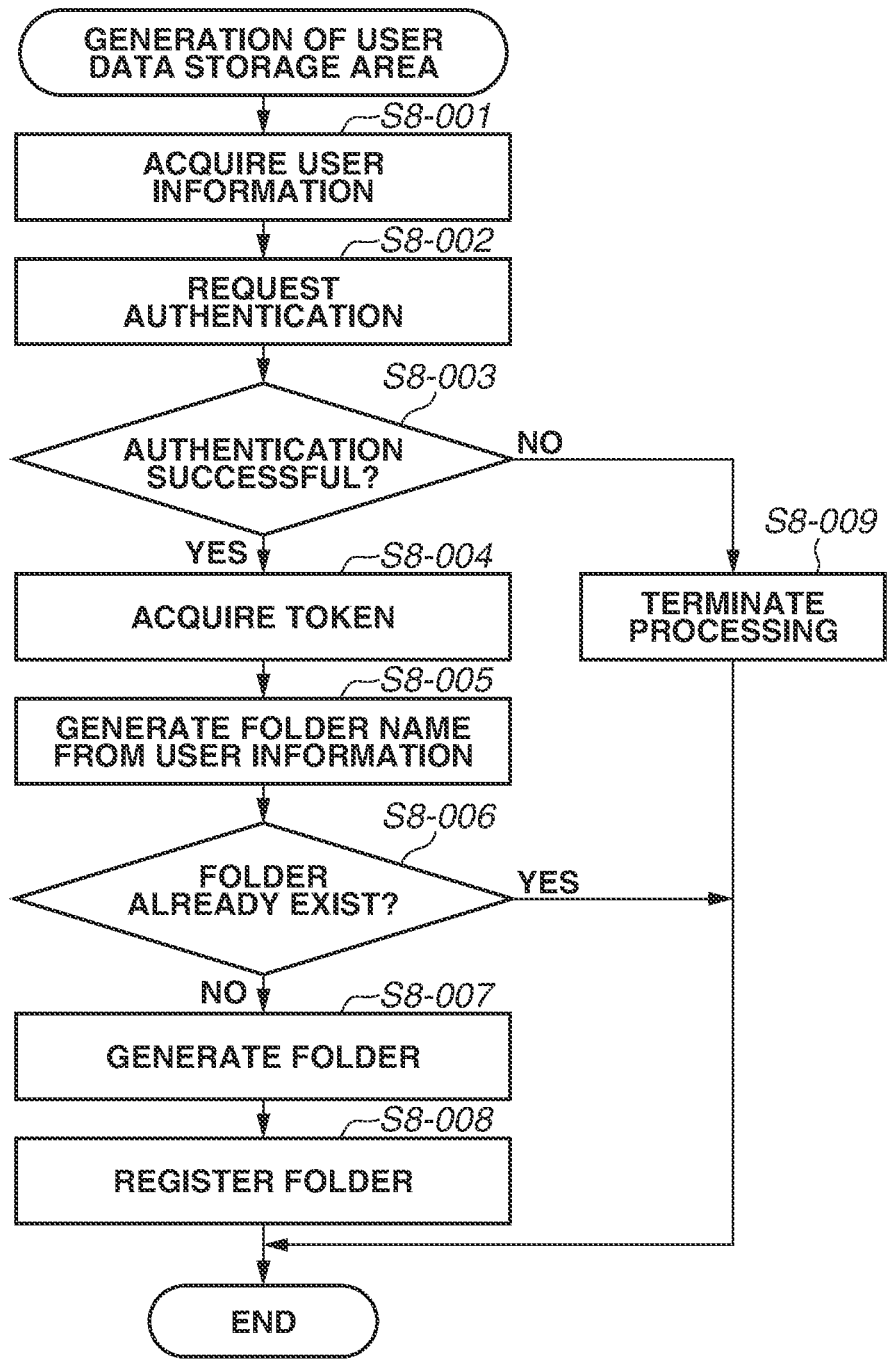
FIG. 8 is a flowchart illustrating a flow of processing for generating a user data storage area in the browser processing unit.

FIG. 8 is a flowchart illustrating a flow of processing for generating a user data storage area in the browser processing unit 2-50. A program corresponding to the processing in the flowchart is started if the user information notification (in step S606) illustrated in FIG. 6 is transmitted to the image generation server 1-20. The processing is a part of the program configuring the overall control unit 2-51 and the browser engine 2-52 illustrated in FIG. 2B. The processing is executed by the CPU 2-01 in the virtual machine 1-07 illustrated in FIG. 2A. More specifically, the processing in steps S8-002, S8-003, and S8-004 is a part of the program configuring the browser engine 2-52, and other processing is a part of the program configuring the overall control unit 2-51.

In step S8-001, the CPU 2-01 acquires the user name and the password, which are the user information.

In step S8-002, the CPU 2-01 requests the authentication site 1-10 to perform authentication processing using the acquired user name and password.

In step S8-003, the CPU 2-01 determines whether the authentication is successful. In a case where the authentication is successful (YES in step S8-003), the processing proceeds to step S8-004. In a case where the authentication is not successful (NO in step S8-003), the processing proceeds to step S8-009.

In step S8-004, the CPU 2-01 acquires a token from the authentication site 1-10 as a result of successful authentication.

In step S8-005, the CPU 2-01 generates a unique folder name from the user name, which is the user information.

In step S8-006, the CPU 2-01 determines whether a folder with the generated folder name already exists in the storage 1-09. If the folder exists (YES in step S8-006), the subsequent processing is skipped, and the user data storage area generation processing is terminated. If the folder does not exist (NO in step S8-006), the processing proceeds to step S8-007.

In step S8-007, the CPU 2-01 generates a folder with the folder name generated in step S8-005 under a predetermined parent folder in the storage 1-09.

Then, in step S8-008, the CPU 2-01 registers a path of the generated folder with the browser engine 2-52, and the processing is terminated. As in the processing in FIG. 7, the folder is registered with the browser engine 2-52, so that a user data file, such as a cookie or a local storage, is automatically stored in the folder.

On the other hand, in a case where the authentication fails in step S8-003 (NO in step S8-003), the processing proceeds to step S8-09. In step S8-009, the browser processing is terminated. In the browser control unit 3-60 that receives termination of the processing, the browser display unit 3-63, which is the sub-module, displays a message indicating that the authentication has failed on the operation unit 3-12 to notify the user of occurrence of an error.

Figure 9:
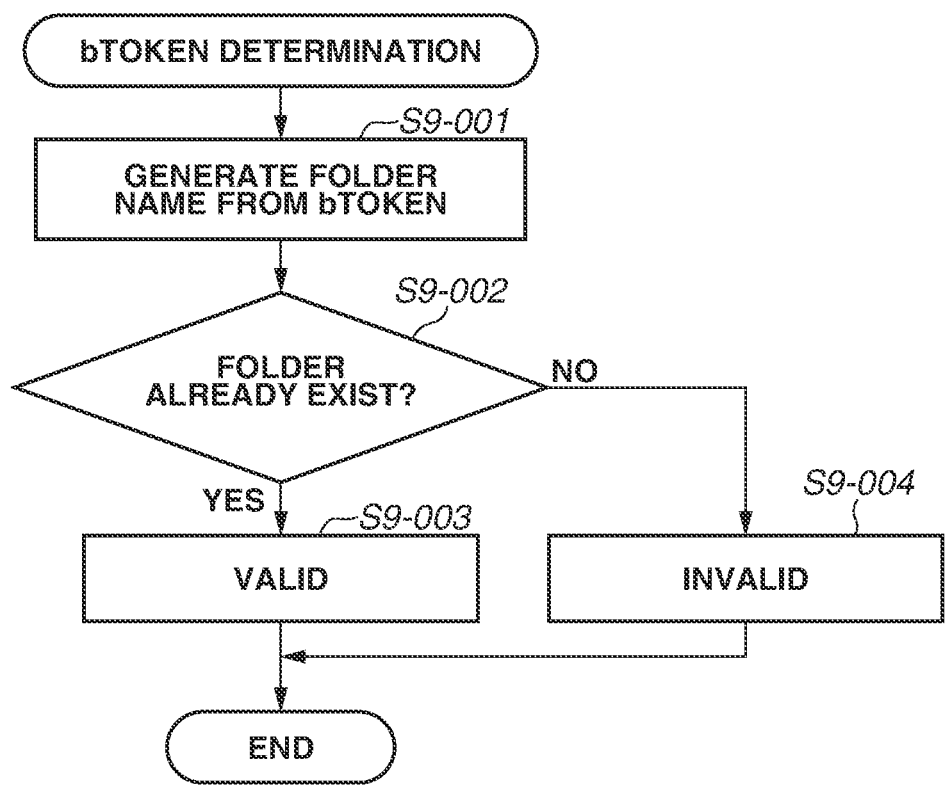
FIG. 9 is a flowchart illustrating a flow of token determination processing.

FIG. 9 is a flowchart illustrating a flow of bToken determination processing. The processing in FIG. 9 is a part of the program configuring the overall control unit 2-51 in the browser processing unit 2-50. The processing is started each time a request including the bToken is received, like the access request in step S613 illustrated in FIG. 6, and the processing is executed by the CPU 2-01 in the virtual machine 1-07 illustrated in FIG. 2A.

In step S9-001, the CPU 2-01 generates a unique folder name from the received bToken using the same logic as in step S8-005 illustrated in FIG. 8. More specifically, the CPU 2-01 generates a folder name from the clientID, as illustrated in FIGS. 11A and 11B, included in the bToken.

In step S9-002, the CPU 2-01 determines whether a folder with the generated folder name already exists in the storage 1-09. If the folder exists (YES in step S9-002), then in step S9-003, it is determined that the bToken is valid. If the folder does not exist (NO in step S9-002), then in step S9-004, it is determined that the bToken is invalid.

In a case where it is determined that the bToken is invalid, the browser processing unit 2-50 notifies the browser control unit 3-60 of occurrence of an internal error. Then, in the browser control unit 3-60, the browser display unit 3-63, which is the sub-module, displays a message about the internal error on the operation unit 3-12 to notify the user of the occurrence of the error.

As described above, according to the present exemplary embodiment, user information is managed in a folder for each user. FIG. 12 illustrates an example of a folder structure in which user data is stored.

According to the present exemplary embodiment, individual folders such as child folders 12-02 to 12-05 are arranged under a parent folder 12-01. With this configuration, information about each individual or each device can be managed in an independent path.

The child folder 12-02 is an example of the folder name generated in step S7-002 illustrated in FIG. 7.

The child folder 12-02 has a folder name based on the MAC address, and the folder name includes a character string obtained by encoding a character string of the MAC address with base64.

Meanwhile, the child folders 12-03 to 12-05 are examples of the folder names generated in step S8-005 illustrated in FIG. 8. The child folders 12-03 to 12-05 each have a folder name including a character string obtained by encoding the user name in the user information with base64. In the example illustrated in FIG. 12, the child folder names are generated from the user information of pooh, tigger, and piglet, respectively.

According to the first exemplary embodiment, base64 encoding is used to obtain the character strings of the child folder names, but other methods can be used to obtain the character strings.

As described above, according to the present exemplary embodiment, a user data file for each user or each apparatus can be held on the cloud. In other words, respective user data files for a plurality of users and a plurality of apparatuses can be managed in a distinguishable manner. Thus, a user who uses the cloud browser system can perform web browsing optimized for each user or each apparatus. For example, in a case where a user accesses an external cloud service that requires login using the cloud browser system 1-00, it makes it possible to automatically input authentication information, such as an ID and password, appropriate for the user who is using the cloud browser system. Further, in a case where a user accesses a shopping site or the like using the cloud browser system 1-00, it makes it possible to automatically input personal information such as address, age, gender, telephone number, and e-mail address of the user who is using the cloud browser system.

The present exemplary embodiment of the present disclosure may be applied to a system including a plurality of devices or to an apparatus including a single device. For example, the above-described functions may be implemented by configuring a part of the software module to be executed by an external server and acquiring a result of processing performed by the external server.

Figure 10:
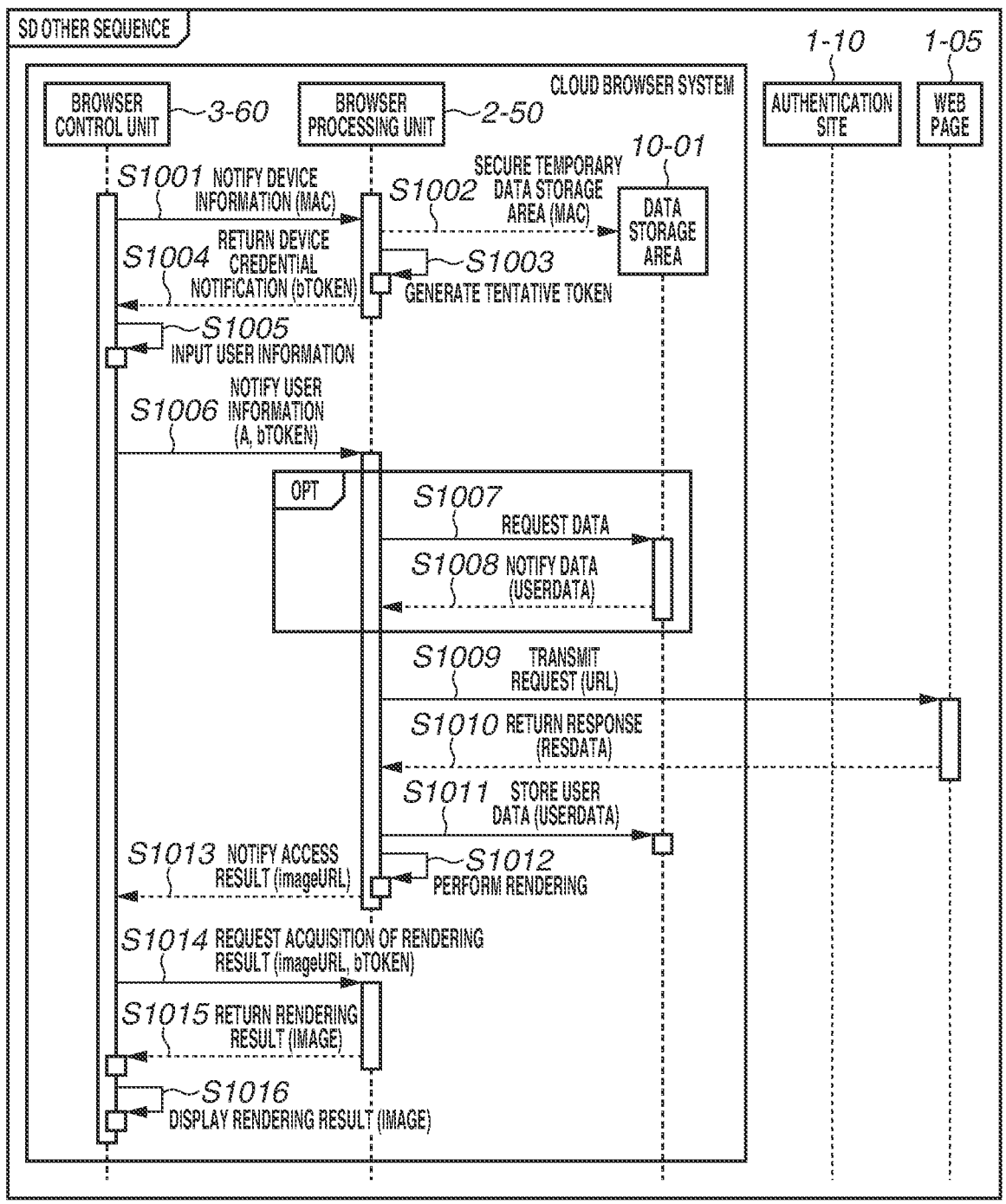
FIG. 10 is a sequence diagram illustrating standard interaction among blocks in a cloud browser system according to one or more aspects of the present disclosure.

According to the first exemplary embodiment, the cloud browser system is configured such that a user data file can be stored and managed on the cloud for each user who uses the cloud browser system. However, in an environment in which a single image forming apparatus is used by only one user or by a very limited number of users, the same effect can be obtained even if the cloud browser system is configured such that a user data file is stored and managed for each apparatus rather than for each user. FIG. 10 illustrates an example of a sequence in this case. Processing performed in steps S1001 to S1004 in FIG. 10 is similar to that in steps S601 to S604 in FIG. 6. However, the processing in steps S1001 to S1004 can be executed without user intervention, so that there is no disadvantage for a user even if there is no restriction to execute the processing only for the first time like the processing in steps S601 to S604. Processing in steps S1005 to S1016 is substantially the same as that in steps S612 to S623 illustrated in FIG. 6. The sequence in FIG. 10 differs from the sequence in FIG. 6 only in the processing in step S1005 where step S9-001 in the token determination processing described in FIG. 9 is executed. In this step, the same logic as in step S7-002 illustrated in FIG. 7 is used instead of that in step S8-005 illustrated in FIG. 8. With this configuration, there is no need to manage data for each user, so that the authentication site 1-10 is unnecessary.

According to the above-described exemplary embodiment, validity determination of the bToken is implemented by a very simple configuration as illustrated in FIG. 9. However, for example, a configuration may be employed in which a signature is added to the bToken. Alternatively, a configuration may be employed in which user data is managed in association with a token in the image generation server 1-20 such that only an authorized user can access the user data storage area 6-02 in the storage 1-09. With this configuration, a security level of user data can be more strengthened.

According to the above-described exemplary embodiment, a user is requested to input user information each time in step S605 in FIG. 6. Alternatively, for example, it may be configured such that the browser control unit 3-60 requests the storage control unit 3-55 to store the input user information in the storage 3-04, and the user data, once input in to the cloud browser system, can be selected from a list from the next and subsequent times. With this configuration, convenience can be further improved.

According to the above-described exemplary embodiment, the user data storage area 6-02 is configured such that it looks equivalent to a network file system in order to facilitate registration of data into the browser engine 2-52, which is the sub-module of the browser processing unit 2-50. However, the storage 1-09 in the image generation server 1-20 does not necessarily need to look equivalent to the network file system. Specifically, a data storage area may be configured on a binary large object (BLOB) storage service provided by a cloud service provider.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-109641, filed Jul. 7, 2022, which is hereby incorporated by reference herein in its entirety.

What is claimed is:

1. A web browsing system comprising:
a server configured to perform rendering of a web page; and
a communication terminal configured to display the web page based on a result of the rendering,
wherein the communication terminal:
transmits identification information of a user to the server;
receives a token from the server, wherein the token includes an authentication result information obtained by the server performing authentication processing based on the identification information of the user;
transmits address information about the web page with the received token to the server; and
receives a rendering image corresponding to the web page from the server, and
wherein the server:
receives the identification information of the user from the communication terminal;
performs the authentication processing based on the received identification information of the user to obtain the authentication result information;
transmits the token including the obtained authentication result information to the communication terminal;
receives the address information with the token from the communication terminal;
acquires user data from a storage of the server based on the received token, wherein the user data is managed in a distinguishable manner from other user data in the storage;
accesses and obtains the web page corresponding to the received address information, wherein the acquired user data is used as necessary when accessing the web page;
generates the rendering image by interpreting the obtained web page; and
transmits the generated rendering image to the communication terminal,
wherein the transmission of the identification information of the user from the communication terminal to the server, the authentication processing of the identification information of the user and the transmission of the token from the server to the communication terminal are skipped until the token expires.

2. The web browsing system according to claim 1, wherein the server requests an external site to perform the authentication processing based on the received identification information of the user.

3. The web browsing system according to claim 1,
wherein the server generates a folder based on the identification information of the user in the storage of the server,
wherein the folder stores the user data associated with the token therein.

4. The web browsing system according to claim 1, wherein the communication terminal is an image forming apparatus that forms an image on a sheet.

5. The web browsing system according to claim 4, wherein the image forming apparatus is further configured to display a plurality of items including an item corresponding to a print function and an item corresponding to a function of acquiring the rendering image.

6. A server that performs rendering of a web page and communicates with a communication terminal that displays the web page based on a result of the rendering,
wherein the server:
receives identification information of a user from the communication terminal;
performs authentication processing based on the received identification information of the user to obtain authentication result;
transmits a token including the obtained authentication result to the communication terminal;
receives address information with the token from the communication terminal;
acquires user data from a storage of the server based on the received token, wherein the user data is managed in a distinguishable manner from other user data in the storage;
accesses and obtains the web page corresponding to the received address information, wherein the acquired user data is used as necessary when accessing the web page;
generates a rendering image by interpreting the web page; and
transmits the generated rendering image to the communication terminal,
wherein the receiving of the identification information of the user from the communication terminal, the authentication processing of the identification information of the user and the transmission of the token to the communication terminal are skipped until the token expires.

7. A method for controlling a server that performs rendering of a web page and communicates with a communication terminal that displays the web page based on a result of the rendering, the method comprising:
receiving identification information of user from the communication terminal;
performing authentication processing based on the received identification information of the user to obtain authentication result;
transmitting a token including the obtained authentication result to the communication terminal;
receiving address information with the token from the communication terminal;
acquiring user data from a storage of the server based on the received token, wherein the user data is managed in a distinguishable manner from other user data in the storage;
accessing and obtaining the web page corresponding to the received address information, wherein the acquired user data is used as necessary when accessing the web page;
generating a rendering image by interpreting the web page; and
transmitting the generated rendering image to the communication terminal,
wherein the receiving of the identification information of the user from the communication terminal, the authentication processing of the identification information of the user and the transmission of the token to the communication terminal are skipped until the token expires.

* * * * *